US012663777B2

(12) United States Patent
Yamaguchi et al.

(10) Patent No.: US 12,663,777 B2
(45) Date of Patent: Jun. 23, 2026

(54) OPERATION CONTROL DEVICE AND PROGRAM

(71) Applicant: FANUC CORPORATION, Yamanashi (JP)

(72) Inventors: Takehiro Yamaguchi, Yamanashi (JP); Koichiro Horiguchi, Yamanashi (JP); Takashi Idei, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 368 days.

(21) Appl. No.: 18/553,513

(22) PCT Filed: Jun. 2, 2021

(86) PCT No.: PCT/JP2021/021094

§ 371 (c)(1),
(2) Date: Sep. 29, 2023

(87) PCT Pub. No.: WO2022/254638

PCT Pub. Date: Dec. 8, 2022

(65) Prior Publication Data

US 2024/0192656 A1 Jun. 13, 2024

(51) Int. Cl.
G05B 19/402 (2006.01)
B23Q 15/12 (2006.01)
G05B 19/416 (2006.01)

(52) U.S. Cl.
CPC ........... G05B 19/402 (2013.01); B23Q 15/12 (2013.01); *G05B 2219/39321* (2013.01)

(58) Field of Classification Search
CPC ........ G05B 19/402; G05B 2219/39321; G05B 19/416; B23Q 15/12

(Continued)

(56) References Cited

U.S. PATENT DOCUMENTS

| | | | | |
|---|---|---|---|---|
| 10,369,583 B2 * | 8/2019 | Meissner | ................ | B05B 16/90 |
| 2015/0241868 A1 * | 8/2015 | Matsumoto | ........ | B23K 26/0892 |
| | | | | 700/114 |
| 2023/0042097 A1 * | 2/2023 | Horiguchi | .......... | G05B 19/4182 |

FOREIGN PATENT DOCUMENTS

| | | |
|---|---|---|
| CN | 104865894 A | 8/2015 |
| JP | H06-253578 A | 9/1994 |

(Continued)

OTHER PUBLICATIONS

International Search Report issued in PCT/JP2021/021094; mailed Aug. 24, 2021.

*Primary Examiner* — Michael J Brown
(74) *Attorney, Agent, or Firm* — Studebaker Brackett PLLC

(57) ABSTRACT

Provided are an operation control device and program that can improve processing speed while suppressing the occurrence of synchronization errors. This operation control device uses a synthesis drive signal obtained by synthesizing two drive signals to drive by switching a drive speed of a first drive shaft, and uses one of the synthesized drive signals to drive a second drive shaft for performing a task different from the first drive shaft. The operation control device comprises: a positional deviation calculation unit for calculating a positional deviation of the first drive shaft before switching the driving speed of the first drive shaft and calculating a positional deviation of the second drive shaft; and a gain value calculation unit for calculating a gain value of the first drive shaft after switching the operating speed, on the basis of the drive speed of the first drive shaft before switching the operating speed, the calculated positional deviation of the first drive shaft, and the calculated positional deviation of the second drive shaft.

7 Claims, 8 Drawing Sheets

(58) Field of Classification Search
USPC .......................................................... 700/159
See application file for complete search history.

(56) References Cited

FOREIGN PATENT DOCUMENTS

| JP | H07-125828 | A | 5/1995 |
|----|------------|---|--------|
| JP | H07-230312 | A | 8/1995 |
| JP | 2713566 | B2 | 2/1998 |
| JP | 2005-216135 | A | 8/2005 |
| JP | 2006-252392 | A | 9/2006 |
| JP | 2007-042068 | A | 2/2007 |
| JP | 2009-208206 | A | 9/2009 |
| JP | 2010-178510 | A | 8/2010 |
| JP | 3200252 | U | 10/2015 |

* cited by examiner

FIG. 2

TIME t0     TIME t1     TIME t2     TIME t3

Figure 5:
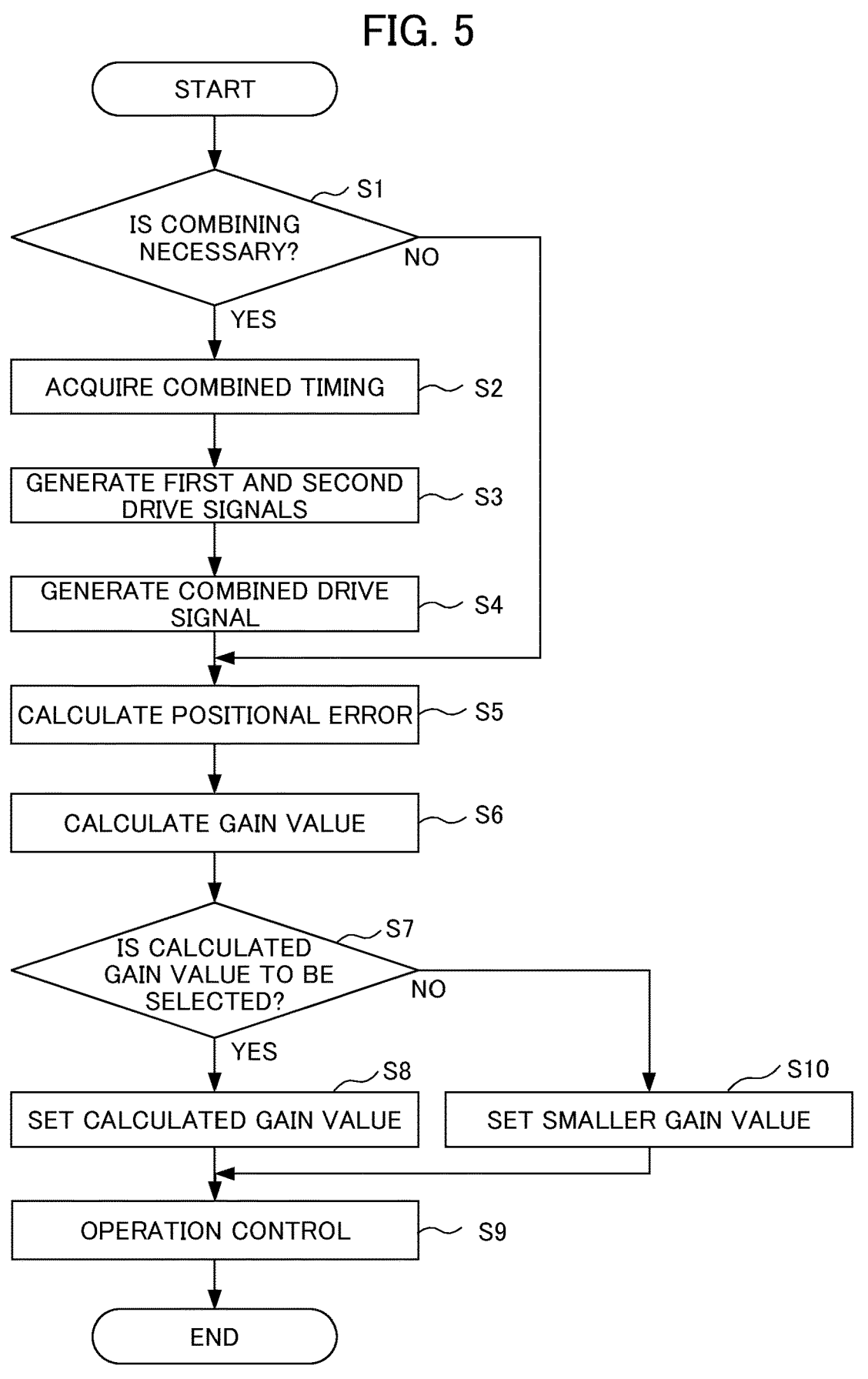

START

S1
IS COMBINING NECESSARY?

NO

YES

ACQUIRE COMBINED TIMING — S2

GENERATE FIRST AND SECOND DRIVE SIGNALS — S3

GENERATE COMBINED DRIVE SIGNAL — S4

CALCULATE POSITIONAL ERROR — S5

CALCULATE GAIN VALUE — S6

S7
IS CALCULATED GAIN VALUE TO BE SELECTED?

NO

YES

SET CALCULATED GAIN VALUE — S8

SET SMALLER GAIN VALUE — S10

OPERATION CONTROL — S9

END

FIG. 6

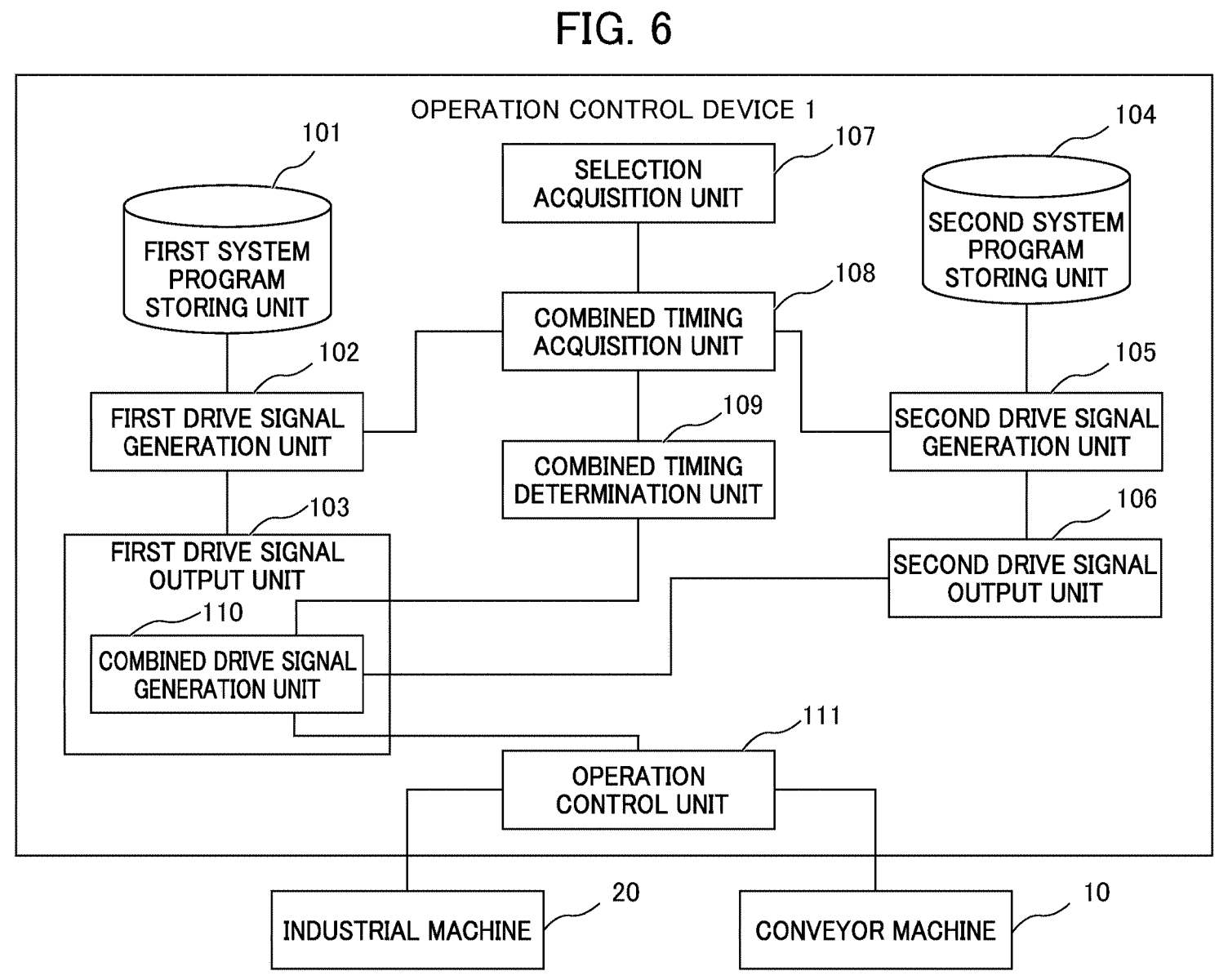

OPERATION CONTROL DEVICE 1

SECOND SYSTEM PROGRAM STORING UNIT — 104

SECOND DRIVE SIGNAL GENERATION UNIT — 105

SECOND DRIVE SIGNAL OUTPUT UNIT — 106

SELECTION ACQUISITION UNIT — 107

COMBINED TIMING ACQUISITION UNIT — 108

COMBINED TIMING DETERMINATION UNIT — 109

FIRST SYSTEM PROGRAM STORING UNIT — 101

FIRST DRIVE SIGNAL GENERATION UNIT — 102

FIRST DRIVE SIGNAL OUTPUT UNIT — 103

COMBINED DRIVE SIGNAL GENERATION UNIT — 110

OPERATION CONTROL UNIT — 111

CONVEYOR MACHINE — 10

INDUSTRIAL MACHINE — 20

FIG. 7

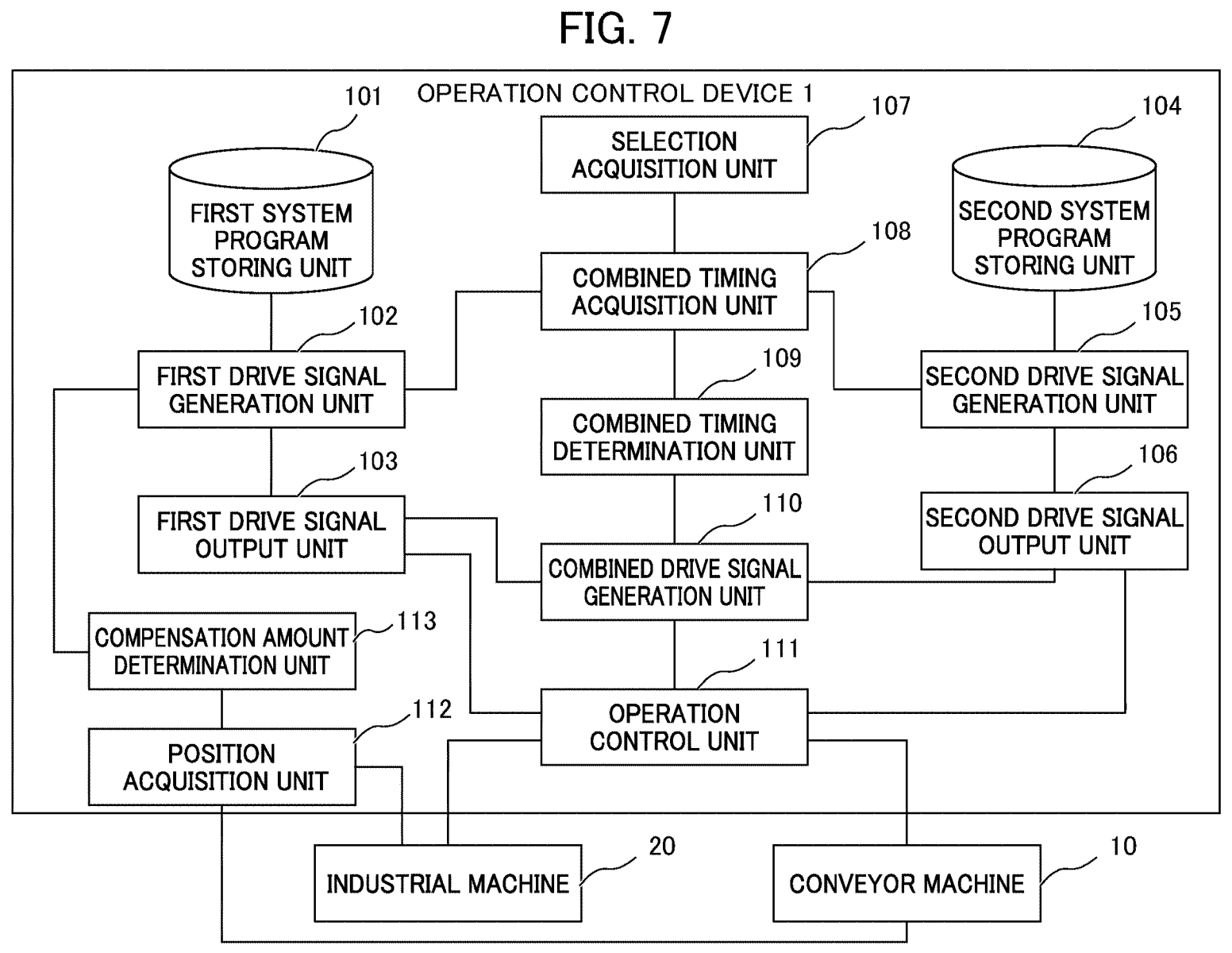

OPERATION CONTROL DEVICE 1

101 — FIRST SYSTEM PROGRAM STORING UNIT

102 — FIRST DRIVE SIGNAL GENERATION UNIT

103 — FIRST DRIVE SIGNAL OUTPUT UNIT

104 — SECOND SYSTEM PROGRAM STORING UNIT

105 — SECOND DRIVE SIGNAL GENERATION UNIT

106 — SECOND DRIVE SIGNAL OUTPUT UNIT

107 — SELECTION ACQUISITION UNIT

108 — COMBINED TIMING ACQUISITION UNIT

109 — COMBINED TIMING DETERMINATION UNIT

110 — COMBINED DRIVE SIGNAL GENERATION UNIT

111 — OPERATION CONTROL UNIT

112 — POSITION ACQUISITION UNIT

113 — COMPENSATION AMOUNT DETERMINATION UNIT

10 — CONVEYOR MACHINE

20 — INDUSTRIAL MACHINE

FIG. 8

OPERATION CONTROL DEVICE AND PROGRAM

TECHNICAL FIELD

The present disclosure relates to an operation control device and a program.

BACKGROUND ART

Conventionally, a production system that machines a workpiece has been known. The production system includes a conveyor machine that conveys the workpiece, at least one industrial machine that is disposed along the conveyor machine, and an operation control device that controls operation of the conveyor machine and the industrial machine.

The industrial machine includes a tool used to machine the workpiece. The industrial machine uses the tool to machine the conveyed workpiece. Thereby, the industrial machine is able to machine the workpiece into a desired shape.

The operation control device has, for example, both a function of controlling the conveyor machine and a function of controlling the industrial machine. The operation control device causes both the functions to sequentially operate to cause the industrial machine to machine the workpiece. That is, the operation control device uses drive signals of two systems to cause the production system to operate.

When controlling the production system using drive signals of the two systems, it is desirable that the operation control device causes one of the drive signals and the other of the drive signals to be synchronized with each other. It is desirable that the operation control device handles one of the drive signals and the other of the drive signals as one drive signal, for example. Thereby, it is possible to improve production efficiency. What has been proposed as such a device is a computer numerical controller (CNC) system that superimposes a movement command for an axis on a CNC side and a movement command for an axis on a programmable machine controller (PMC) side on each other to perform movement control on the axes (for example, see Patent Document 1). Furthermore, such a device has been proposed that causes a spindle and a servo axis to be synchronized with each other to perform tapping (for example, see Patent Document 2).

Patent Document 1: Japanese Unexamined Patent Application, Publication No. H7-230312
Patent Document 2: Japanese Patent No. 2713566

DISCLOSURE OF THE INVENTION

Problems to be Solved by the Invention

The CNC system described in Patent Document 1 superimposes a movement command for the axis on the CNC side and a movement command for the axis on the PMC side on each other. Thereby, the CNC system described in Patent Document 1 allows both CNC control and PMC control to be operated.

By the way, when using drive signals of two systems to be sequentially operated, driving using the other one of the drive signals is executed after axis movement using one of the drive signals ends. Therefore, when simply superimposing drive signals of the two systems on each other, there may be difficulties in achieving proper operation using the drive signals of the two systems.

Furthermore, when two axes are caused to be synchronized with each other, as described in Patent Document 2, a synchronization error may occur due to a difference in gain between the two axes. In this case, allowing a gain of the servo axis to coincide with a gain of the spindle makes it possible to decrease a synchronization error. That is, setting a gain to coincide with another smaller gain makes it possible to decrease a synchronization error. On the other hand, when setting a gain to coincide with another smaller gain, it is possible to secure machining accuracy, but a processing speed lowers. It is then advantageous if it is possible to suppress occurrence of a synchronization error and to increase a processing speed.

Means for Solving the Problems (1) The present disclosure relates to an operation control device that uses a combined drive signal in which two drive signals are combined with each other to switch a drive speed of a first drive axis to drive the first drive axis, and uses one of the drive signals to be combined with each other to drive a second drive axis that performs another task than a task that the first drive axis performs. The operation control device includes: a positional error calculation unit that calculates a positional error of the first drive axis before switching the drive speed of the first drive axis, and calculates a positional error of the second drive axis; and a gain value calculation unit that calculates a gain value of the first drive axis after switching the operating speed, based on the drive speed of the first drive axis before switching an operating speed, the calculated positional error of the first drive axis, and the calculated positional error of the second drive axis.

(2) Furthermore, the present disclosure relates to a program that causes a computer to function as an operation control device that uses a combined drive signal in which two drive signals are combined with each other to switch a drive speed of a first drive axis to drive the first drive axis, and uses one of the drive signals to be combined with each other to drive a second drive axis that performs another task than a task that the first drive axis performs. The program causes the computer to function as: a positional error calculation unit that calculates a positional error of the first drive axis before switching the drive speed of the first drive axis, and calculates a positional error of the second drive axis; and a gain value calculation unit that calculates a gain value of the first drive axis after switching the operating speed, based on the drive speed of the first drive axis before switching an operating speed, the calculated positional error of the first drive axis, and the calculated positional error of the second drive axis.

Effects of the Invention

According to the present disclosure, it is possible to provide an operation control device and a program that make it possible to suppress occurrence of a synchronization error and to increase a processing speed.

BRIEF DESCRIPTION OF THE DRAWINGS

FIG. 2 is a conceptual diagram illustrating an outline of operation in the production system including the operation control device according to the first embodiment;

FIG. 3 is a conceptual diagram illustrating the outline of operation in the production system including the operation control device according to the first embodiment;

FIG. 5 is a flowchart illustrating operation of the operation control device according to the first embodiment;

FIG. 6 is a block diagram illustrating a configuration of an operation control device according to a modification example;

FIG. 7 is a block diagram illustrating a configuration of an operation control device according to a modification example; and FIG. 8 is a schematic diagram illustrating a common axis controlled by an operation control device according to a modification example.

PREFERRED MODE FOR CARRYING OUT THE INVENTION

Operation control devices 1 and programs according to embodiments of the present disclosure will now be described herein with reference to FIGS. 1 to 7. Before describing the operation control devices 1 and the programs according to the embodiments, an outline of a production system 100 including any of the operation control devices 1 will first be described.

Figure 1:
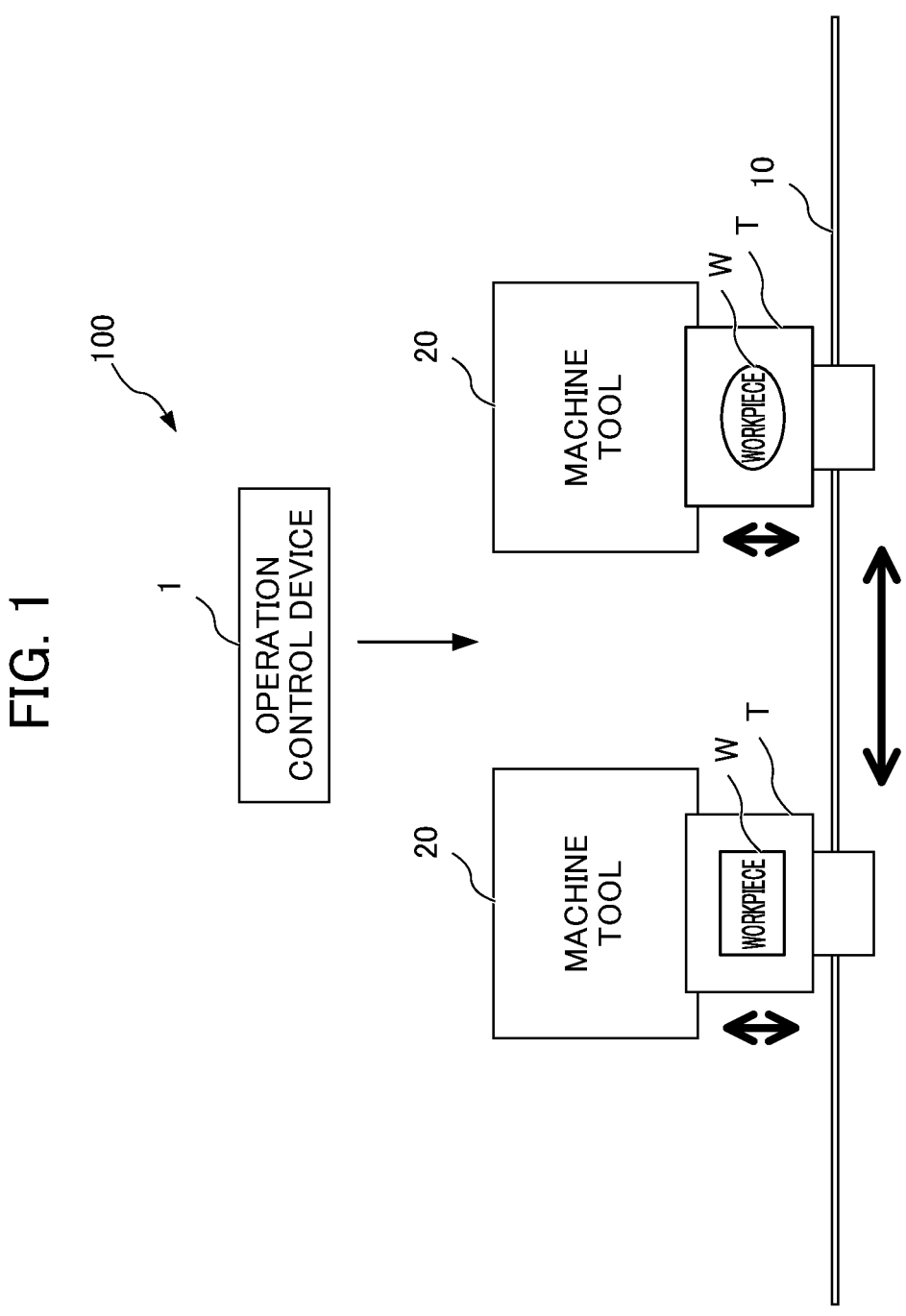
FIG. 1 is a schematic configuration diagram illustrating a production system including an operation control device according to a first embodiment of the present disclosure.

The production system 100 represents, for example, a system that conveys a workpiece W and machines the workpiece W. The production system 100 includes, as illustrated in FIG. 1, a conveyor machine 10, an industrial machine 20, and the operation control device 1.

The conveyor machine 10 represents a machine that conveys the workpiece W. The conveyor machine 10 causes, for example, a motor (not shown) to rotate to convey the workpiece W. The conveyor machine 10 conveys the workpiece W in a predetermined direction.

The industrial machine 20 represents, for example, a machine tool. There are two industrial machines 20 disposed, as illustrated in FIG. 1, in a conveying direction of the workpiece W. The industrial machine 20 uses, for example, a tool 21 (see FIG. 2) to machine the workpiece W into a shape set beforehand. Note that the industrial machine 20 may be a machine that varies in type such as a machine tool, an industrial robot, a service robot, a pressure-forging machine, or an injection molding machine.

The operation control device 1 represents a device that controls operation of the conveyor machine 10 and the industrial machines 20. The operation control device 1 uses, for example, at least drive signals of two systems to control operation of the production system 100. The operation control device 1 uses, for example, as a drive signal of a first system, a signal of a programmable logic controller (PLC) for simple machining, for performing simple operation including conveying, and for managing devices on the production system 100. Specifically, the operation control device 1 uses the PLC for causing the conveyor machine 10 to convey the workpiece W. Furthermore, the operation control device 1 uses, for example, as a drive signal of a second system, a drive signal of a numerical controller (NC) for performing machining into a complicated shape and for performing complicated operation. Specifically, the operation control device 1 uses the NC for moving an axis of the tool 21 attached to the industrial machine 20.

Figure 2:
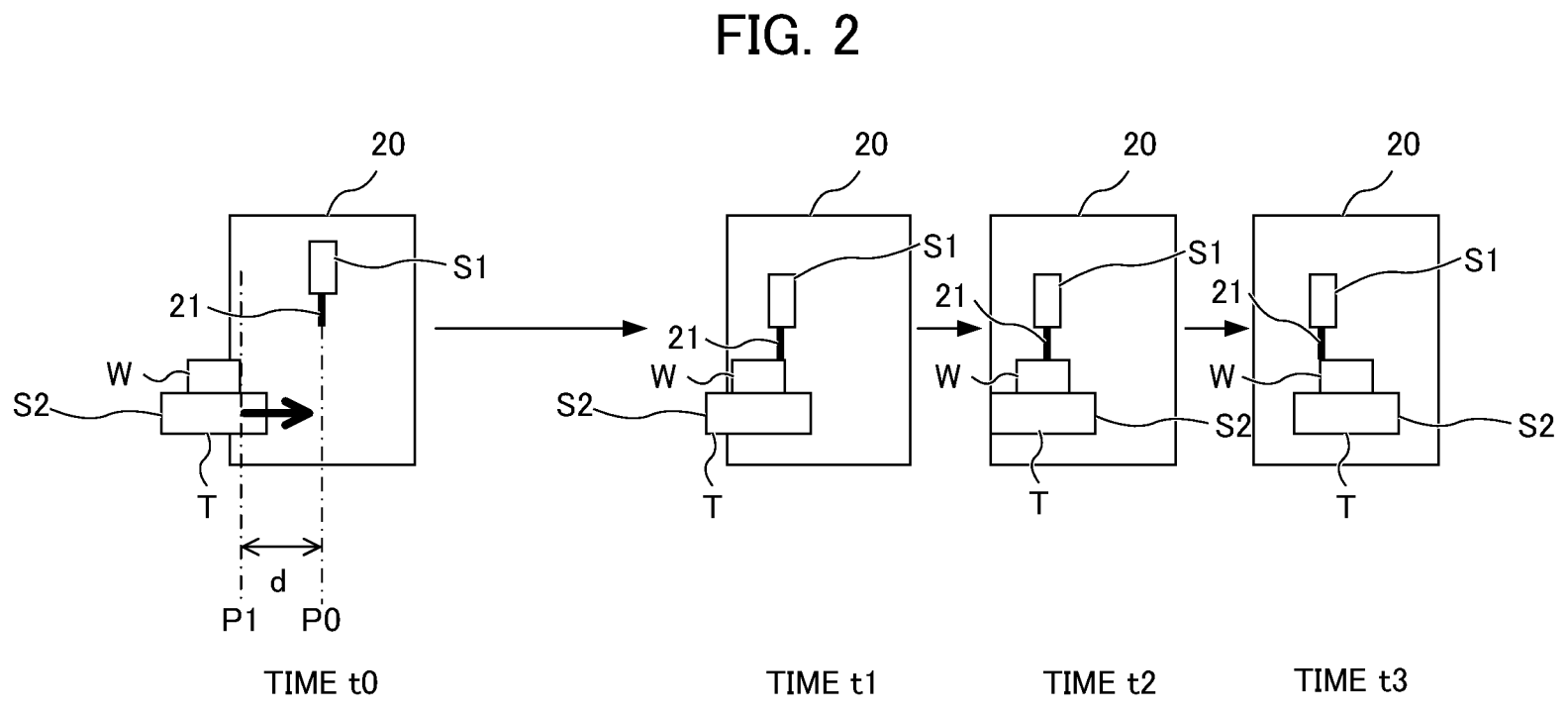
Figure 3:
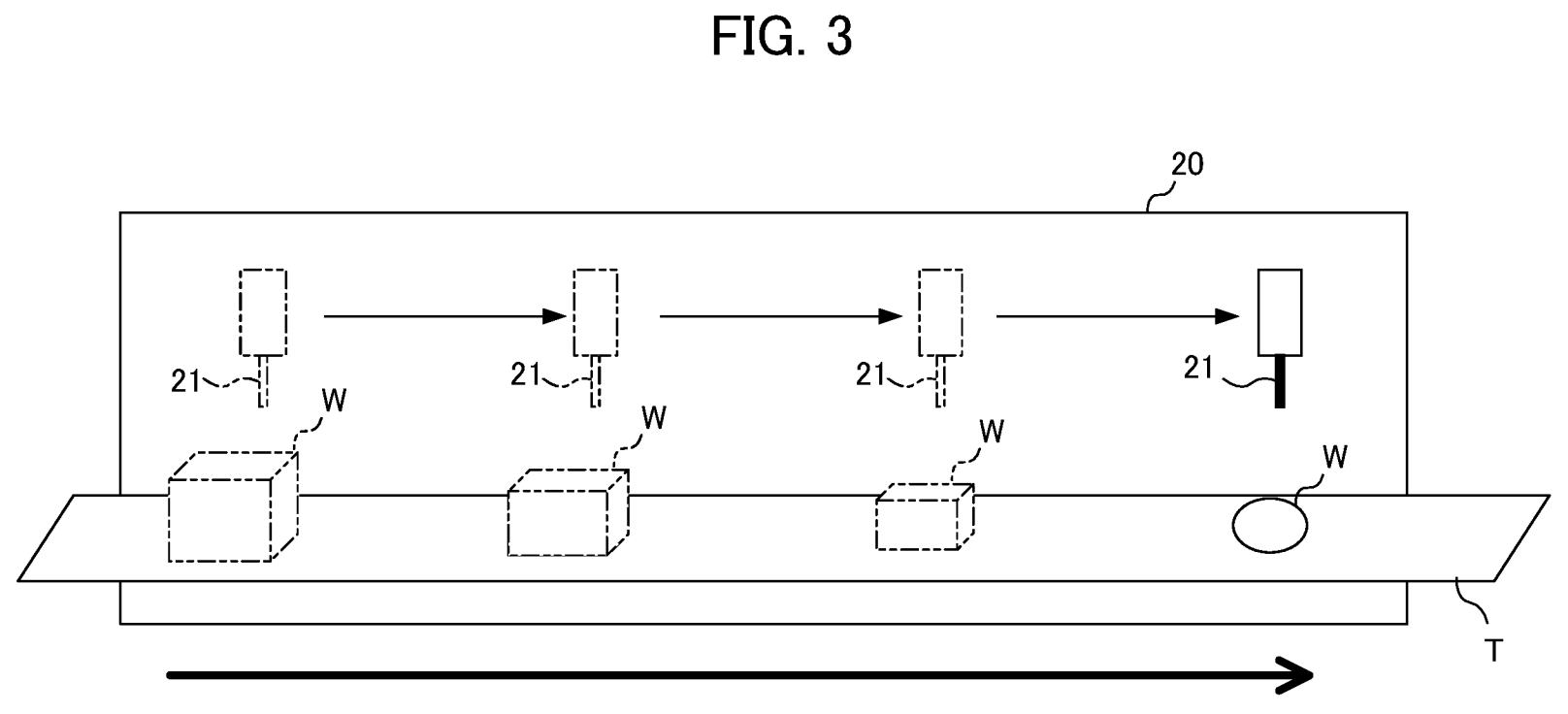

Note herein that the operation control device 1 combines or synthesizes (superimposes), for example, a drive signal of the first system and a drive signal of the second system with each other to control operation of the production system 100. In particular, the operation control device 1 uses a combined drive signal in which two drive signals are combined with each other to drive a first drive axis S1 (for example, a tool axis) and uses one of the drive signals to be combined with each other to convey the workpiece. In the operation control device 1, for example, as illustrated in FIGS. 2 and 3, the PLC is caused to convey the workpiece W mounted on a conveying table T (a second drive axis S2 (in the present embodiment, a conveying axis that conveys the workpiece)) (axis control), and the NC causes the tool 21 (the first drive axis S1 (in the present embodiment, the tool axis)) to machine the workpiece W. The second drive axis S2 represents a drive axis used to perform another task than a task that the first drive axis S1 performs. That is, the operation control device 1 causes, at a time t0, the tool 21 to move to a machining position P1, at which the tool 21 is moved toward the workpiece W by a distance d with respect to a reference position P0 of the tool 21, to start machining of the workpiece W using the tool 21. Next, the operation control device 1 causes, at times t1, t2, and t3, as the workpiece W is conveyed, the tool 21 to machine the workpiece W to execute both conveying and machining.

First Embodiment

Figure 4:
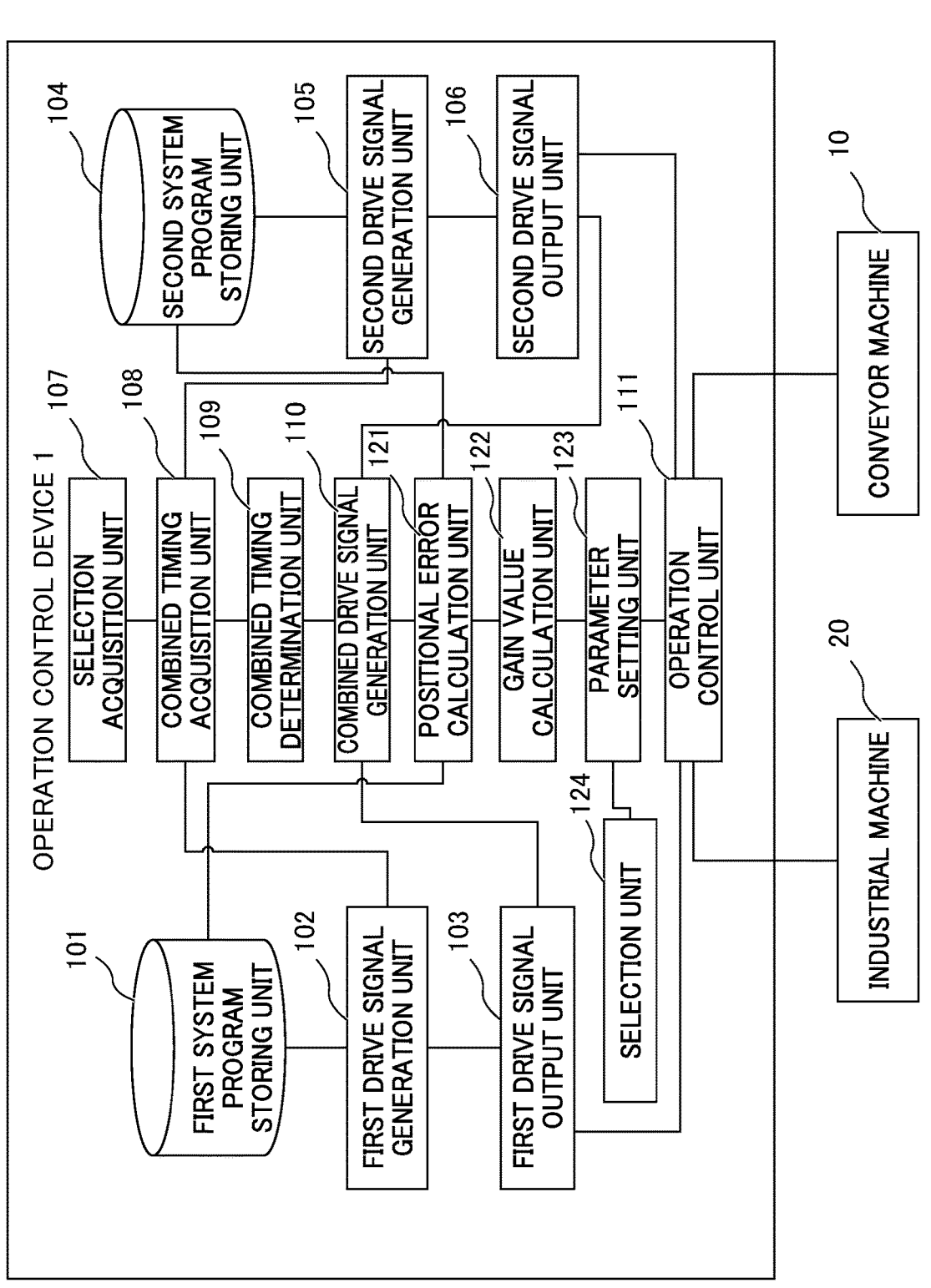
FIG. 4 is a block diagram illustrating a configuration of the operation control device according to the first embodiment.

Next, an operation control device 1 and a program according to a first embodiment of the present disclosure will now be described herein with reference to FIGS. 4 and 5. The operation control device 1 according to the present embodiment uses at least drive signals of two systems to control operation of the production system 100 including the industrial machine 20. The operation control device 1 includes, as illustrated in FIG. 4, a first system program storing unit 101, a first drive signal generation unit 102, a first drive signal output unit 103, a second system program storing unit 104, a second drive signal generation unit 105, a second drive signal output unit 106, a selection acquisition unit 107, a combined timing acquisition unit 108, a combined timing determination unit 109, a combined drive signal generation unit 110, a positional error calculation unit 121, a gain value calculation unit 122, a parameter setting unit 123, a selection unit 124, and an operation control unit 111. Note that, in the present embodiment, it is described, as an example, a case when a state where the workpiece (the second drive axis S2) is stopped is switched to a state where the workpiece is being conveyed (a state where the second drive axis S2 is driven).

The first system program storing unit 101 represents, for example, a secondary memory medium such as a hard disk. The first system program storing unit 101 stores a program used to generate a drive signal of the first system. In the present embodiment, the first system program storing unit 101 stores a program for controlling the PLC, for example. Specifically, the first system program storing unit 101 stores a program that causes an axis of the conveyor machine 10 to convey the workpiece W. That is, the first system program storing unit 101 stores a program for driving the second drive axis S2 to convey the workpiece W. Furthermore, the first system program storing unit 101 stores a gain value when the second drive axis S2 is to be driven.

The first drive signal generation unit 102 is achieved as a central processing unit (CPU) operates, for example. The first drive signal generation unit 102 generates a first drive signal representing a drive signal of the first system. In the present embodiment, the first drive signal generation unit 102 generates a drive signal for driving the axis of the conveyor machine 10. That is, the first drive signal generation unit 102 generates a drive signal for driving the second drive axis S2.

The first drive signal output unit 103 is achieved as the CPU operates, for example. The first drive signal output unit 103 outputs a first drive signal representing a drive signal of the first system. The first drive signal output unit 103 outputs a first drive signal at a predetermined control frequency, for example. Specifically, the first drive signal output unit 103 outputs a first drive signal at a control frequency shorter than a control frequency at which the second drive signal output unit 106 described later outputs a signal.

The second system program storing unit 104 represents, for example, a secondary memory medium such as a hard disk. The second system program storing unit 104 stores a program used to generate a drive signal of the second system. In the present embodiment, the second system program storing unit 104 stores a program for controlling the NC, for example. Specifically, the second system program storing unit 104 stores a program for causing the axis (the first drive axis S1) of the tool 21 of the industrial machine 20 to machine the workpiece W. That is, the second system program storing unit 104 stores a program for driving the first drive axis S1 to machine the workpiece W. Furthermore, the second system program storing unit 104 stores a gain value when the first drive axis S1 is to be driven.

The second drive signal generation unit 105 is achieved as the CPU operates, for example. The second drive signal generation unit 105 generates a second drive signal representing a drive signal of the second system. In the present embodiment, the second drive signal generation unit 105 generates a drive signal for driving the axis (first drive axis S1) of the tool 21 of the industrial machine 20. That is, the second drive signal generation unit 105 generates a drive signal for driving the first drive axis S1.

The second drive signal output unit 106 is achieved as the CPU operates, for example. The second drive signal output unit 106 outputs a second drive signal representing a drive signal of the second system. The second drive signal output unit 106 outputs a second drive signal at a drive frequency longer than a drive frequency at which the first drive signal output unit 103 outputs a signal, for example.

The selection acquisition unit 107 is achieved as the CPU operates, for example. The selection acquisition unit 107 acquires a selection of whether or not to generate a combined drive signal. The selection acquisition unit 107 acquires, when a first drive signal and a second drive signal are to be combined with each other, for example, 'a selection of whether combining is "necessary"'. On the other hand, the selection acquisition unit 107 acquires, when a first drive signal and a second drive signal are not to be combined with each other, 'a selection of whether combining is "unnecessary"'.

The combined timing acquisition unit 108 is achieved as the CPU operates, for example. The combined timing acquisition unit 108 externally acquires a timing of combining a first drive signal and a second drive signal with each other. The combined timing acquisition unit 108 acquires, when 'combining is "necessary"' is selected, a timing of combining a first drive signal and a second drive signal with each other. The combined timing acquisition unit 108 acquires a program block or a conveyance position to be combined as a combined timing, for example. Specifically, the combined timing acquisition unit 108 acquires, as combined timings, in FIG. 2, a first drive signal by which a mounting table of the workpiece W is conveyed to the position P1 and a second drive signal by which the tool 21 (the first drive axis S1) is driven to machine the workpiece W. The combined timing acquisition unit 108 uses an input device (not shown) such as a keyboard to acquire combined timings.

The combined timing determination unit 109 is achieved as the CPU operates, for example. The combined timing determination unit 109 determines a combining timing of combining a first drive signal and a second drive signal with each other. The combined timing determination unit 109 determines a timing acquired by the combined timing acquisition unit 108 as a combined timing.

The combined drive signal generation unit 110 is achieved as the CPU operates, for example. The combined drive signal generation unit 110 generates a combined drive signal when a selection of generating a combined drive signal is acquired. Furthermore, the combined drive signal generation unit 110 combines a first drive signal and a second drive signal with each other to generate a combined drive signal based on the determined combined timing. The combined drive signal generation unit 110 combines a first drive signal and a second drive signal, where at least either of the first drive signal or the second drive signal has undergone predetermined compensation, to generate a combined drive signal. The combined drive signal generation unit 110 combines a first drive signal and a second drive signal, where at least either of the first drive signal or the second drive signal is multiplied by a predetermined multiplying factor, to generate a combined drive signal, for example. Furthermore, the combined drive signal generation unit 110 combines a first drive signal and a second drive signal, where a symbol of at least either of the first drive signal or the second drive signal is inverted, to generate a combined drive signal, for example. Furthermore, the combined drive signal generation unit 110 generates a combined drive signal of changing a relative position of a target object to be controlled by a second drive signal with respect to a position of a target object to be controlled by a first drive signal, for example. Specifically, the combined drive signal generation unit 110 generates a combined drive signal of changing a relative position of the tool 21 (the first drive axis S1) to be controlled by a second drive signal with respect to a position of the workpiece W to be conveyed by a first drive signal. More specifically, the combined drive signal generation unit 110 generates a combined drive signal of compensating a difference between a position of the workpiece W to be conveyed by a first drive signal and a reference position of the tool 21 (the first drive axis S1) to be controlled by a second drive signal. The combined drive signal generation unit 110 generates a combined drive signal of causing the tool 21 (the first drive axis S1) to move from the reference position P0 to the machining position P1 in a direction opposite to the conveying direction of the workpiece W, in FIG. 2, for example. That is, the combined drive signal generation unit 110 generates a combined drive signal of driving the axis to cause the tool 21 (the first drive axis S1) to move by the distance d in the direction opposite to the conveying direction of workpiece W.

The positional error calculation unit 121 is achieved as the CPU operates, for example. The positional error calculation unit 121 calculates a positional error of the first drive axis S1 before switching a drive speed of the first drive axis S1, and calculates a positional error of the second drive axis S2. The positional error calculation unit 121 calculates Mathematical Expression (1) described below, for example, to calculate a positional error before switching the drive speed. That is, the positional error calculation unit 121 calculates a positional error of the first drive axis S1 when the first drive axis S1 is driven by another one of drive signals to be combined into a combined drive signal.

Note herein that Emcn1 represents a positional error of the first drive axis S1. Fmcn represents a command speed of the first drive axis S1 by a drive signal before switching the drive speed. Gmcn represents a parameter setting value of a gain of a machining axis before switching the drive speed.

$$Emcn1=Fmcn/Gmcn \tag{1}$$

Furthermore, the positional error calculation unit 121 calculates Mathematical Expression (2) described below, for example, to calculate a positional error of the second drive axis S2. That is, the positional error output unit calculates a positional error of the second drive axis S2 when the second drive axis S2 is driven by one of drive signals to be combined into a combined drive signal. Note herein that Eplc represents a positional error of the second drive axis S2. Fplc represents a command speed of the second drive axis S2 by a drive signal before switching the drive speed. Gplc represents a parameter setting value of a gain of the second drive axis S2 before switching the drive speed.

$$Eplc=Fplc/Gplc \tag{2}$$

The gain value calculation unit 122 is achieved as the CPU operates, for example. The gain value calculation unit 122 calculates, based on the drive speed of the first drive axis S1 before switching an operating speed, the calculated positional error of the first drive axis S1, and the calculated positional error of the second drive axis S2, a gain value of the first drive axis S1 after switching the operating speed. The gain value calculation unit 122 calculates a gain value of the drive axis during driving after switching the operating speed to reduce a difference between the calculated positional error of the first drive axis S1 before switching the drive speed and the positional error of the first drive axis S1 after switching the drive speed. The gain value calculation unit 122 calculates, for example, a setting value for a gain during driving after switching the operating speed to allow the difference between the calculated positional error of the first drive axis S1 before switching the drive speed and the positional error of the first drive axis S1 after switching the drive speed to fall within a predetermined range. The gain value calculation unit 122 uses, for example, a positional error of the first drive axis S1 when conveying the workpiece W, as illustrated in Mathematical Expression (3) described below, to calculate a gain value of the first drive axis S1 to make positional errors of the first drive axis S1 before and after changing the drive speed to be identical to each other, as illustrated in Mathematical Expressions (4) [(4-1) to (4-4)] described below. Note herein that Emcn2 represents a positional error of the first drive axis S1 when conveying the workpiece. Gmcn2 represents a gain value of the first drive axis S1 after switching the drive speed.

$$Emcn2=(Fmcn+Fplc)/Gmcn2 \tag{3}$$

Note herein that Gmcn2 is acquired by assigning Mathematical Expressions (1) to (3) in Mathematical Expression (4-1) described below to modify it into Mathematical Expressions (4-2) to (4-4).

(Mathematical Expression 4)

$$Emcn1=Emcn2-Eplc \tag{4-1}$$

$$Fmcn/Gmcn=(Fmcn+Fplc)/Gmcn2-Fplc/Gplc \tag{4-2}$$

$$(Fmcn+Fplc)/Gmcn2=Fmcn/Gmcn+Fplc/Gplc \tag{4-3}$$

$$Gmcn2=(Fmcn+Fplc)/(Fmcn/Gmcn+Fplc/Gplc) \tag{4-4}$$

The parameter setting unit 123 is achieved as the CPU operates, for example. The parameter setting unit sets the calculated gain value as a parameter of the first drive axis S1. The parameter setting unit 123 sets the calculated gain value as a parameter of the first drive axis S1 for the operation control device described later, for example.

The selection unit 124 is achieved as the CPU operates, for example. The selection unit 124 selects, for a parameter to be set, either the calculated gain value or the smaller one of either the gain value of the first drive axis S1 before switching the drive speed or the gain value of the second drive axis S2. The selection unit 124 externally acquires a selection input and selects a gain value to be set, for example. The selection unit 124 selects the smaller one of either a gain value of the first drive axis S1 before switching the drive speed or a gain value of the second drive axis S2, for example, to make it possible to allow a processing speed to lower and to secure machining accuracy.

Note herein that the parameter setting unit sets the selected gain value as a parameter of the first drive axis S1. The parameter setting unit 123 sets the calculated gain value as a parameter of the first drive axis S1 before switching the drive speed, for example.

The operation control unit 111 is achieved as the CPU operates, for example. The operation control unit 111 controls operation of the production system 100 based on the first drive signal, the second drive signal, and the combined drive signal. The operation control unit 111 controls operation of the conveyor machine 10 based on a first drive signal, in FIG. 2, for example. That is, the operation control unit 111 controls conveyance of the workpiece W based on the first drive signal. Furthermore, the operation control unit 111 controls machining operation of the tool 21 (the first drive axis S1) based on a second drive signal. That is, the operation control unit 111 controls axis movement for machining operation of the tool 21 (the first drive axis S1) based on the second drive signal. Furthermore, the operation control unit 111 controls movement operation of the tool 21 (the first drive axis S1) based on the combined drive signal. That is, the operation control unit 111 controls positional movement of the tool 21 (the first drive axis S1) in accordance with conveyance of the workpiece W (driving of the second drive axis S2) based on the combined drive signal. The operation control unit 111 instructs the conveyor machine 10 (the second drive axis S2) and the motor (the first drive axis S1) of the industrial machine 20 to operate to control operation of the workpiece W (the second drive axis S2) and the tool 21 (the first drive axis S1). In the present embodiment, the operation control unit 111 uses the set parameter, the combined drive signal after switching takes place, and one of the drive signals to be combined with each other to control operation of the first drive axis S1 and the second drive axis S2.

Next, how operation of the computer numerical controller according to the present embodiment flows will now be described with reference to the flowchart illustrated in FIG. 5. The selection acquisition unit 107 first acquires a selection of whether or not combining a first drive signal and a second drive signal with each other is necessary. The combined timing acquisition unit 108 determines whether or not combining is necessary (Step S1). When combining is to be executed (Step S1: YES), the combined timing acquisition unit 108 acquires a combined timing. Then, the processing proceeds to Step S2. On the other hand, when combining is not to be executed (Step S1: NO), the combined timing acquisition unit 108 causes the first drive signal generation unit 102 and the second drive signal generation unit 105 to respectively generate a first drive signal and a second drive signal. Then, the processing proceeds to Step S5.

At Step S2, the combined timing acquisition unit 108 acquires a timing of performing combining. The combined timing acquisition unit 108 sends the acquired timing of performing combining to the combined timing determination unit 109.

Next, the combined timing determination unit 109 determines a combined timing of combining a first drive signal and a second drive signal with each other based on the acquired timing of performing combining. The first drive signal output unit 103 and the second drive signal output unit 106 respectively generate a first drive signal and a second drive signal (Step S3), and send the generated first drive signal and the generated second drive signal to the combined drive signal generation unit 110. Furthermore, the first drive signal output unit 103 and the second drive signal output unit 106 respectively send the generated first drive signal and the generated second drive signal to the operation control unit 111.

Next, the combined drive signal generation unit 110 generates, based on the combined timing that the combined timing determination unit 109 has determined, a combined drive signal from the generated first drive signal and the generated second drive signal (Step S4).

Next, the positional error calculation unit 121 calculates positional errors of the first drive axis S1 and the second drive axis S2 (Step S5). Next, the gain value calculation unit 122 calculates a gain value after switching the drive speed (Step S6).

Next, a gain value to be set as a parameter is selected (Step S7). When the calculated gain value is to be set as a parameter (Step S7: YES), the processing proceeds to Step S8. On the other hand, when the smaller one of either the set gain value of the first drive axis S1 or the set gain value of the second drive axis S2 is to be used (Step S7: NO), the processing proceeds to Step S10.

At Step S8, the parameter setting unit 123 sets the calculated gain value as a parameter of the first drive axis S1. Next, the processing proceeds to Step S9.

At Step S9, the operation control unit 111 uses the combined drive signal for the set parameter to control the first drive axis S1. Furthermore, the operation control unit 111 uses one of the drive signals included in the combined drive signal to drive the second drive axis S2. Thereby, operation under the present flow ends.

At Step S10, the parameter setting unit 123 sets the smaller one of either the gain value of the first drive axis S1 or the gain value of the second drive axis S2 as a parameter of the first drive axis S1. Next, the processing proceeds to Step S9. Note that, when no combined drive signal has been generated, the operation control unit 111 controls the conveyor machine 10 and the industrial machine 20 based on the first drive signal and the second drive signal.

Next, the program according to the present disclosure will now be described herein. It is possible to achieve each of the components included in the operation control device 1 in the form of hardware or software or a combination of hardware and software. Note herein that achievement in the form of software means achievement when a computer reads and executes a program.

It is possible to use a non-transitory computer readable medium that varies in type to store the program, and to supply the program to a computer. Examples of the non-transitory computer readable medium include tangible storage media that vary in type. Examples of the non-transitory computer readable medium include magnetic recording media (for example, flexible disc, magnetic tape, and hard disk drive), magneto-optical recording media (for example, magneto-optical disc), compact disc-read only memories (CD-ROM), compact disc-recordable (CD-R), compact disc-rewritable (CD-R/W), and semiconductor memories (for example, mask ROM, programmable ROM (PROM), erasable PROM (EPROM), flash ROM, and random access memory (RAM)). Furthermore, the program may be supplied to the computer via a transitory computer readable medium that varies in type. Examples of the transitory computer readable medium include electric signals, optical signals, and electromagnetic waves. A transitory computer readable medium is able to supply the program to the computer via wired communication channels such as electric wires and optical fibers or wireless communication channels.

With the operation control device 1 and the program according to the first embodiment, it is possible to achieve effects described below.

(1) The operation control device 1 is an operation control device that uses a combined drive signal in which two drive signals are combined with each other to switch a drive speed of the first drive axis S1 to drive the first drive axis S1, and uses one of the drive signals to be combined with each other to drive the second drive axis S2 that performs another task than a task that the first drive axis S1 performs. The operation control device includes: the positional error calculation unit 121 that calculates a positional error of the first drive axis S1 before switching the drive speed of the first drive axis S1, and calculates a positional error of the second drive axis S2; and the gain value calculation unit 122 that calculates, based on the drive speed of the first drive axis S1 before switching an operating speed, the calculated positional error of the first drive axis S1, and the calculated positional error of the second drive axis S2, a gain value of the first drive axis S1 after switching the operating speed. Thereby, even when inertia of the first drive axis S1 has changed due to the drive speed having been changed, the operation control device 1 is able to suppress occurrence of a synchronization error. Since it is possible to suppress occurrence of a synchronization error, it is possible to improve machining accuracy.

(2) The gain value calculation unit 122 calculates a gain value of the first drive axis S1 during driving after switching the operating speed to reduce a difference between the calculated positional error of the first drive axis S1 before switching the drive speed and the positional error of the first drive axis S1 after switching the drive speed. Furthermore, the gain value calculation unit 122 calculates a setting value for a gain during driving after switching the operating speed to allow the difference between the calculated positional error of the first drive axis S1 before switching the drive speed and the positional error of the first drive axis S1 after switching the drive speed to fall within a predetermined range. Thereby, the operation control device 1 makes it possible to further suppress occurrence of a synchronization error and to improve machining accuracy.

(3) The operation control device 1 further includes: the parameter setting unit 123 that sets the calculated gain value as a parameter of the first drive axis S1; and the operation control unit 111 that uses the set parameter, the combined drive signal after switching takes place, and the one of the drive signals to be combined with each other to control operation of the first drive axis S1 and the second drive axis S2. Thereby, the operation control device 1 is able to control and make a positional error of the first drive axis S1 closer to that before operating the second drive axis S2, making it possible to suppress occurrence of a synchronization error.

(4) The operation control device 1 further includes the selection unit 124 that selects, for a parameter to be set, either the calculated gain value or smaller one of either the gain value of the first drive axis S1 before switching the drive speed or the gain value of the second drive axis S2, in which the parameter setting unit 123 sets the selected gain value as a parameter of the first drive axis S1. Thereby, since it is possible to switch machining accuracy in accordance with a situation, it is possible to provide a highly versatile operation control device.

Second Embodiment

Next, an operation control device 1 and a program according to a second embodiment of the present disclosure will now be described herein. It is to be noted that, to describe the second embodiment, like reference numerals designate identical or corresponding components in the embodiment described above. The description of the components are thus omitted or simplified. The operation control device according to the second embodiment differs from the first embodiment in that a drive speed of the second drive axis S2 changes while the first drive axis S1 is driven by a combined drive signal. Then, in the operation control device according to the second embodiment, operation of the positional error calculation unit 121 and the gain value calculation unit 122 differ.

The positional error calculation unit 121 calculates a positional error of the first drive axis S1 before switching a drive speed of the second drive axis S2 by one of drive signals and positional errors of the second drive axis S2 before and after switching the drive speed. The positional error calculation unit 121 calculates a positional error of the first drive axis S1 before switching a drive speed with Mathematical Expression (5) described below. Furthermore, the positional error calculation unit 121 calculates positional errors of the second drive axis S2 before and after switching the drive speed with Mathematical Expressions (6) [(6-1) and (6-2)] described below. Furthermore, the positional error calculation unit 121 uses Mathematical Expression (7) indicating a positional error of the first drive axis S1 after switching the drive speed. Then, the positional error calculation unit 121 calculates, as indicated by Mathematical Expressions (8) [(8-1) and (8-2)], a positional error of the first drive axis S1 after switching the drive speed to make the first drive axis S1 unchanged before and after switching the drive speed of the second drive axis S2. Note herein that Fmcn1 represents a drive speed of the first drive axis S1 before switching a drive speed. Emcn1 represents a positional error of the first drive axis S1 before switching the drive speed. Gmcn1 represents a gain before switching the drive speed. Fmcn2 represents a drive speed of the first drive axis S1 after switching the drive speed. Emcn1 represents a positional error of the first drive axis S1 after switching the drive speed. Gmcn1 represents a gain after switching the drive speed.

Fplc1 represents a speed of the second drive axis S2 before switching the drive speed. Eplc1 represents a positional error of the second drive axis S2 before switching the drive speed. Gplc1 represents a gain of the second drive axis S2 before and after switching the drive speed. Fplc2 represents a speed of the second drive axis S2 after switching the drive speed. Eplc2 represents a positional error of the second drive axis S2 after switching the drive speed.

$$Emcn1 = Fmcn1/Gmcn1 \tag{5}$$

(Mathematical Expression 6)

$$Eplc1 = Fplc1/Gplc1 \tag{6-1}$$

$$Eplc2 = Fplc2/Gplc1 \tag{6-2}$$

$$Emcn2 = (Fmcn1 + Fplc2)/Gmcn1 \tag{7}$$

Note herein that Mathematical Expression (5), Mathematical Expression (6-1), Mathematical Expression (6-2), and Mathematical Expression (7) are assigned into Mathematical Expression described below (8-1) to calculate the positional error Gmcn2 of the first drive axis S1 after switching the drive speed.

(Mathematical Expression 8)

$$Emcn2 - Eplc2 = Emcn1 - Eplc1 \tag{8-1}$$

$$Gmcn2 = (Fmcn1 + Fplc2)*Gmcn1 - Gplc1/(Fmcn1 - GplC1 + (Fplc2 - Fplc1)*Gmcn1) \tag{8-2}$$

With the operation control device 1 and the program according to the second embodiment, it is possible to achieve effects described below.

(5) The positional error calculation unit 121 calculates a positional error of the first drive axis S1 before switching a drive speed of the second drive axis S2 by one of drive signals and positional errors of the second drive axis S2 before and after switching the drive speed, and the gain value calculation unit 122 calculates, based on the drive speeds of the first drive axis S1 before and after switching the drive speed, the calculated positional error of the first drive axis S1, and the calculated positional errors of the second drive axis S2 before and after switching the drive speed, a gain value of the first drive axis S1 after changing the speed of the second drive axis S2. Thereby, with the operation control device 1 according to the second embodiment, even when a speed of the second drive axis S2 has been switched, it is possible to suppress a synchronization error and to improve machining accuracy.

The operation control devices 1 and the programs according to the desirable embodiments of the present disclosure have been described. However, the present disclosure is not limited to the embodiments described above. It is possible to appropriately change the embodiments. In the embodiments described above, the second drive signal output unit 106 may output a second drive signal to the first drive signal output unit 103, as illustrated in FIG. 6, for example. Furthermore, the combined drive signal generation unit 110 may cause a combined drive signal to be generated in the first drive signal output unit 103. Furthermore, the first drive signal output unit 103 may use a control frequency shorter than a control frequency of an output of the second drive signal to output a first drive signal, a second drive signal, and a combined drive signal. Note herein that the positional error calculation unit 121, the gain value calculation unit 122, the parameter setting unit 123, and the selection unit 124 are disposed between the combined drive signal generation unit 110 and the operation control unit 111, similar to those illustrated in FIG. 4 and the first embodiment. Thereby, it is possible to output a first drive signal, a second drive signal, and a combined drive signal to the operation control unit 111 at a further shorter control frequency. Therefore, it is possible to further increase control timings in number to achieve further finer machining.

Furthermore, in the embodiments described above, a position acquisition unit 112 that acquires positional information of the tool 21 with respect to the workpiece W may further be included, as illustrated in FIG. 7. Furthermore, a compensation amount determination unit 113 that determines a compensation amount for compensating an amount of movement of a target object based on an acquired position may further be included. Furthermore, the operation control unit 111 may control the production system 100 based on a first drive signal including a determined compensation amount, a second drive signal, and a combined drive signal. Note herein that the positional error calculation unit 121, the gain value calculation unit 122, the parameter setting unit 123, and the selection unit 124 are disposed between the combined drive signal generation unit 110 and the operation control unit 111, similar to those illustrated in FIG. 4 and the first embodiment.

The position acquisition unit 112 is achieved as the CPU operates, for example. The position acquisition unit 112 acquires a position of the tool 21 (the first drive axis S1) in a workpiece coordinate system, for example. Furthermore, the position acquisition unit 112 acquires a position of the tool 21 (the first drive axis S1) with respect to the workpiece W based on an output signal of a sensor that acquires the position of the tool 21 (the first drive axis S1), for example.

The compensation amount determination unit 113 is achieved as the CPU operates, for example. The compensation amount determination unit 113 determines a compensation amount (a feedback amount) for a combined drive signal in accordance with relative positions of the workpiece W and the tool 21. The compensation amount determination unit 113 sends the determined compensation amount to the first drive signal generation unit 102. Thereby, the compensation amount determination unit 113 causes the first drive signal generation unit 102 to generate a first drive signal including the determined compensation amount. The operation control unit 111 controls the production system 100 based on the first drive signal including the determined compensation amount, the second drive signal, and the combined drive signal. Thereby, it is possible to achieve such control that flexibly responds to a change in shape of the workpiece W. Therefore, it is possible to improve accuracy of machining performed by the production system 100.

Furthermore, in the embodiments described above, operation of the combined timing acquisition unit 108 is not limited to acquisition of a combined timing inputted into an input device (not shown) such as a keyboard. The combined timing acquisition unit 108 may acquire a combined timing that is set from another program, for example.

Furthermore, in the embodiments described above, it has been described that a first drive signal and a second drive signal are those for the PLC that conveys the workpiece W and the NC that drives the tool 21 (the first drive axis S1). However, the present disclosure is not limited to this case. A first drive signal may be one for an NC that conveys the workpiece W and a PLC that performs simple machining on the workpiece W, for example.

Furthermore, in the embodiments described above, it has been described the operation control devices 1 that control operation using drive signals of the two systems. However, the present disclosure is not limited to this case. The operation control device 1 may control operation using drive signals of three or more systems. For example, when operation of the tool 21 (the first drive axes S1) of each of a plurality of the industrial machines 20 is regarded as one system, the operation control device 1 may control operation using drive signals of three or more systems.

Furthermore, when a first drive signal and a second drive signal are not to be combined with each other in the embodiments described above, the combined drive signal generation unit 110 may not generate a combined drive signal, but may output only the first drive signal and the second drive signal to the operation control unit 111.

Figure 8:
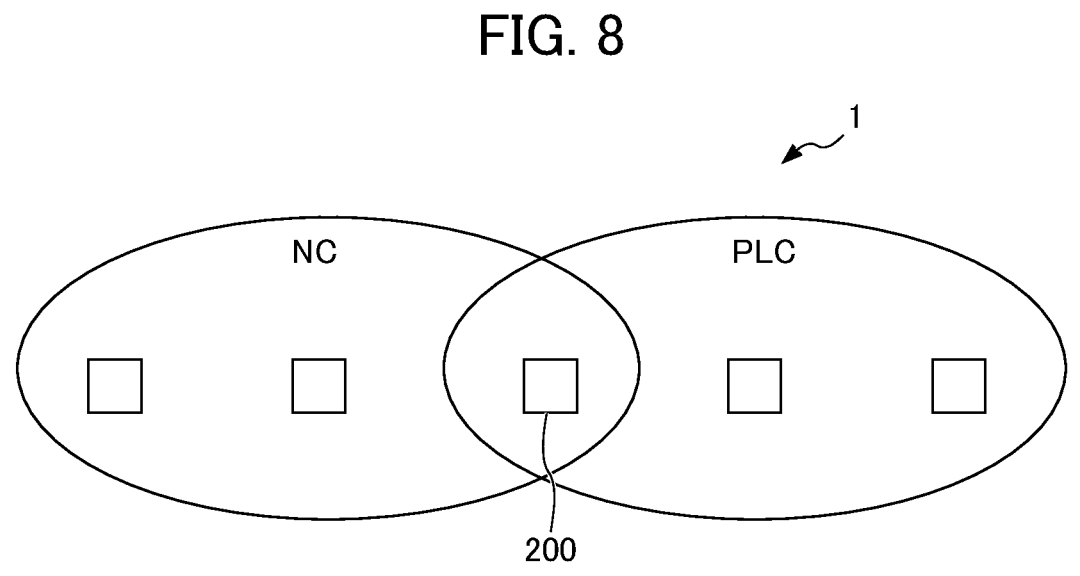

Furthermore, in the embodiments described above, it has been described that a first system represents a PLC and a second system represents an NC. However, the present disclosure is not limited to this case. The production system 100 may include a configuration common to a first system and a second system (a common axis 200), as illustrated in FIG. 8. That is, the production system 100 may include the common axis 200 that is operable based on any signal such as a first drive signal, a second drive signal, or a combined drive signal. When no combined drive signal is to be generated (when a selection of whether combining is "unnecessary" is acquired), the selection acquisition unit 107 may acquire a selection of either a first drive signal or a second drive signal as a signal causing the common axis 200 to operate. The selection acquisition unit 107 may determine a selection of causing the common axis 200 to operate in accordance with either a first drive signal or a second drive signal based on an externally provided input, a command value included in the first drive signal, or a command value included in the second drive signal. Then, the first drive signal output unit 103 and the second drive signal output unit 106 may respectively individually output the first drive signal or the second drive signal to the common axis 200.

Furthermore, in the embodiments described above, the combined timing determination unit 109 combines a first drive signal and a second drive signal with each other based on an acquired combined timing. However, the present disclosure is not limited to this case. The operation control device 1 may not include the combined timing acquisition unit 108 and the combined timing determination unit 109. In this case, the first drive signal output unit 103 and the second drive signal output unit 106 may respectively output a first drive signal and a second drive signal each for which a combined timing has been taken into account beforehand. The combined drive signal generation unit 110 may superimpose, as is, an outputted first drive signal and an outputted second drive signal on each other to generate a combined signal.

Furthermore, in the embodiments described above, the gain value calculation unit 122 may calculate a gain value of the first drive axis S1 in a direction along a drive direction of the second drive axis S2. The gain value calculation unit 122 may calculate a gain value of the first drive axis S1 in a direction along an advancing direction of the workpiece W, for example. Thereby, the gain value calculation unit 122 calculates a gain value in only a direction that affects combining of a first drive signal and a second drive signal with each other, for example. Therefore, it is possible to shorten a period of time for calculating a gain value, compared with a case where gain values in all directions are calculated.

EXPLANATION OF REFERENCE NUMERALS

1 Operation control device
20 Industrial machine

US 12,663,777 B2

15

21 Tool
100 Production system
103 First drive signal output unit
106 Second drive signal output unit
107 Selection acquisition unit
109 Combined timing determination unit
110 Combined drive signal generation unit
111 Operation control unit
112 Position acquisition unit
113 Compensation amount determination unit
121 Positional error calculation unit
122 Gain value calculation unit
123 Parameter setting unit
S1 First drive axis
S2 Second drive axis
W Workpiece
The invention claimed is:

1. An operation control device that uses a combined drive signal in which two drive signals are combined with each other to switch a drive speed of a first drive axis to drive the first drive axis, and uses one of the two drive signals to drive a second drive axis that performs another task than a task that the first drive axis performs, the operation control device comprising:
  a positional error calculation unit that calculates a positional error of the first drive axis before switching the drive speed of the first drive axis, and calculates a positional error of the second drive axis;
  a gain value calculation unit that calculates a gain value of the first drive axis after switching an operating speed, based on the drive speed of the first drive axis before switching the operating speed, the calculated positional error of the first drive axis, and the calculated positional error of the second drive axis;
  a parameter setting unit that sets the calculated gain value as a parameter of the first drive axis; and
  an operation control unit that uses the set parameter, the combined drive signal after switching takes place, and the one of the drive signals to be combined with each other to control operation of the first drive axis and the second drive axis.

2. The operation control device according to claim 1, wherein
  the positional error calculation unit calculates a positional error of the first drive axis before switching a drive speed of the second drive axis by the one of the drive signals or positional errors of the second drive axis before and after switching the drive speed, and
  the gain value calculation unit calculates a gain value of the first drive axis after changing the speed of the second drive axis, based on the drive speeds of the first drive axis before and after switching the drive speed, the calculated positional error of the first drive axis, and the calculated positional errors of the second drive axis before and after switching the drive speed.

3. The operation control device according to claim 1, wherein the gain value calculation unit calculates a gain value of the first drive axis in a direction along a drive direction of the second drive axis.

4. The operation control device according to claim 1, wherein the gain value calculation unit calculates a gain value of the first drive axis during driving after switching the operating speed to reduce a difference between the calculated positional error of the first drive axis before switching the drive speed and the positional error of the first drive axis after switching the drive speed.

5. The operation control device according to claim 4, wherein the gain value calculation unit calculates a setting value for a gain during driving after switching the operating speed to allow the difference between the calculated positional error of the first drive axis before switching the drive speed and the positional error of the first drive axis after switching the drive speed to fall within a predetermined range.

6. The operation control device according to claim 1,
  further comprising a selection unit that selects, for a parameter to be set, either the calculated gain value or smaller one of either the gain value of the first drive axis before switching the drive speed or the gain value of the second drive axis,
  wherein the parameter setting unit sets the selected gain value as a parameter of the first drive axis.

7. A non-transitory computer readable medium which non-transitorily stores a program that causes a computer to function as an operation control device that uses a combined drive signal in which two drive signals are combined with each other to switch a drive speed of a first drive axis to drive the first drive axis, and uses one of the two drive signals to drive a second drive axis that performs another task than a task that the first drive axis performs,
  the program causing the computer to function as:
  a positional error calculation unit that calculates a positional error of the first drive axis before switching the drive speed of the first drive axis, and calculates a positional error of the second drive axis;
  a gain value calculation unit that calculates a gain value of the first drive axis after switching an operating speed, based on the drive speed of the first drive axis before switching the operating speed, the calculated positional error of the first drive axis, and the calculated positional error of the second drive axis;
  a parameter setting unit that sets the calculated gain value as a parameter of the first drive axis; and
  an operation control unit that uses the set parameter, the combined drive signal after switching takes place, and the one of the drive signals to be combined with each other to control operation of the first drive axis and the second drive axis.

* * * * *